United States Patent [19]
Merrill, Jr.

[11] Patent Number: 5,293,941
[45] Date of Patent: Mar. 15, 1994

[54] METHOD OF CONTROLLING FLOW IN A SOIL VENTING WELL

[76] Inventor: LaVaun S. Merrill, Jr., 8006 E. Fremont Ave., Englewood, Colo. 80112

[21] Appl. No.: 979,721

[22] Filed: Nov. 20, 1992

[51] Int. Cl.[5] .............................................. E21B 43/00
[52] U.S. Cl. .................................................... 166/305.1
[58] Field of Search ..................... 166/305.1, 306, 309, 166/311, 312

[56] References Cited

U.S. PATENT DOCUMENTS

| | | | |
|---|---|---|---|
| 3,628,607 | 12/1971 | Dietz | 166/305.1 |
| 4,026,355 | 5/1977 | Johnson et al. | 166/246 |
| 4,183,408 | 1/1980 | Pilkington | 166/314 |
| 4,387,770 | 6/1983 | Hill | 166/305.1 |
| 4,407,366 | 10/1983 | Lieffers et al. | 166/305.1 X |
| 4,754,810 | 7/1988 | Bennett et al. | 166/253 |
| 4,842,068 | 6/1989 | Vercaemer et al. | 166/305.1 X |
| 4,946,312 | 8/1990 | Loock et al. | 405/129 |
| 5,014,788 | 5/1991 | Puri et al. | 166/305.1 X |

Primary Examiner—Thuy M. Bui

[57] ABSTRACT

A method for selectively treating sections of soil which are more remote from a soil venting well than previously treated soil sections. Air is drawn through a first group of passageways in a well casing during treatment of a particular section of soil. Air is then prevented from passing through the first group of passageways, as by sealing them, and is drawn through a second lower group of passageways. By sequentially following these steps, different sections of soil located farther from the well and deeper than previously treated sections can be selectively treated.

10 Claims, 1 Drawing Sheet

METHOD OF CONTROLLING FLOW IN A SOIL VENTING WELL

FIELD OF THE INVENTION

This invention relates to the operation of a soil venting well. More particularly, it relates to a method for controlling the flow of air so as to treat a larger area of soil from the same venting well.

BACKGROUND OF THE INVENTION

With the increased emphasis on environmental matters, one area of attention is in remediation of contaminated vadose zone soil. Soil venting is an attractive in-situ method of extracting vapor from volatile and semivolatile petroleum hydrocarbons and removing adsorbed liquid hydrocarbons from the vadose zone. In this method air is drawn between soil particles to volatilize the contaminant and accelerate the evaporation rate of the adsorbed hydrocarbons, and is then vented to the surf ace through vent wells. The vapor may be treated at the surface by suitable means, such as activated charcoal, so as to be discharged in concentrations compatible with local guidelines.

In carrying out a soil venting process a wellbore is drilled in the zone of interest and a casing containing openings for the passage of air is installed. Typically, the casing includes a screened section for this purpose which extends for a substantial distance, in the order of 10–20 feet, along the length of the casing. When suction is drawn on the vent well to draw air from the surf ace down through the soil, the air tends to follow the shortest flow path, which is from the area immediately surrounding the wellbore to the upper portion of the screened section. Therefore, in order to treat soil outside of this area it is normally necessary to provide additional vent wells. To treat soil which is deeper than the normal flow path of the air it would be necessary to provide new casings having lower screened sections. These are costly procedures, however, and it would be highly desirable to be able to enlarge the scope of treatment without having to employ them.

It is therefore an object of the invention to be able to treat a larger area of soil by means of a vent well without requiring additional wells or drastic modifications to conventional soil venting procedures.

BRIEF SUMMARY OF THE INVENTION

In accordance with the invention, air is drawn through a first group of passageways in the casing of a soil venting well. Air is then prevented from flowing through the first group of passageways and is drawn into the casing instead through a second group of passageways located beneath the first group. More air is thereby caused to flow through soil located radially outwardly of and deeper than the soil through which most of the air was initially drawn.

To prevent air from flowing through the first group of passageways in the casing, the invention contemplates sealing those passageways against the passage of air. This may be accomplished, for example, by means of an inflatable packer or by a gel. By doing this, the invention provides for treatment of soil located outwardly from and deeper than previously treated soil by drawing air through passageways which are lower than the passageways employed during previous treatment operations.

In another aspect of the invention air flow measurements are taken by means of a f low anemometer in order to evaluate flow profiles during soil venting. The anemometer is shrouded so as to channel the air flow in a substantially linear path parallel to the well casing and shield the probe from horizontal flow from the screen at the point of measurement in order to make the readings more accurate.

These and other features of the invention will be made more clear in the detailed description of the preferred embodiment.

DETAILED DESCRIPTION OF THE PREFERRED EMBODIMENT

Figure 1:
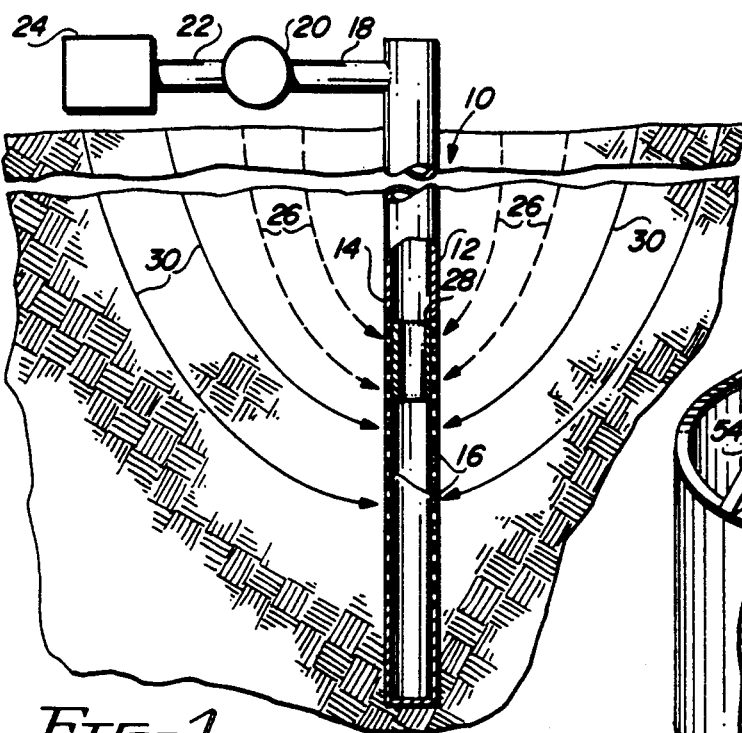
FIG. 1 is a schematic view, shown partially in longitudinal section, of a soil venting well adapted to function in accordance with the invention.

Referring to FIG. 1, a vent well 10 is of typical basic structure, comprised of a wellbore 12 and a casing 14 within the bore. The casing includes a screen section 16 which extends throughout a substantial portion of the length of the casing, providing apertures or passageways through which air may pass. The casing is shown as extending above the ground surface, with the above-ground portion connected, as by a tee, to a lateral conduit 18 leading to a suction fan 20. By reducing the pressure in the casing through operation of the fan, air is drawn from the surface through the soil and screen and into the casing. Air passing through the fan flows through conduit 22 to an optional treatment area 24, where it may be treated by any suitable process, not shown, such as an activated charcoal filter.

During normal operation of the vent well 10 the shortest air flow path from the surface is from immediately around the wellbore to the upper portion of the screened section 16. Most of the air flow will be along typical flow paths as illustrated by the dotted flow lines 26. According to the present invention, the upper portion of the screened section 16 is closed off after the soil contacted by the flow paths 26 has been treated, as indicated by the barrier 28. This causes more air to be drawn from areas farther from the well as indicated by the solid flow lines 30. Note that not only is soil located farther from the well contacted by the new air flow, but soil at a lower depth has higher air flow rates.

Figure 2:
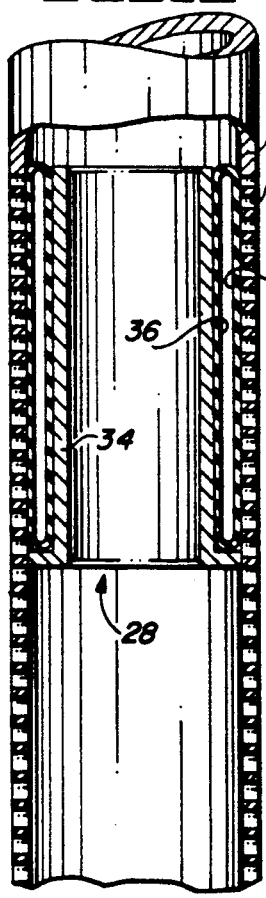
FIG. 2 is an enlarged partial longitudinal sectional view of a portion of a soil venting well casing incorporating a means for blocking the flow of air through an upper portion of a casing screen.

As shown in FIG. 2, one type of barrier 28 f or closing off the upper portion of the casing screen is an inflated or balloon packer. While the details of construction of the packer may vary, any suitable packer of this type may be employed, such packers being well known in the art and readily available. In general, however, such a packer includes a tube or shell 34 which supports spaced impervious inner and outer membranes 36 and 38 connected to each other at top and bottom to form an enclosed annular space. When the packer is inflated, as by introducing air or some other convenient fluid into the annulus, the packer expands against the casing screen, sealing it off against the flow of soil venting air and causing the pattern of venting air flow to change, as discussed above. It will be seen that it is only necessary to lower the packer to seal a next lower portion of the screen in order to again change the pattern of air flow, causing venting air to flow through soil located still farther from the well and force more air into soil located at a lower depth.

The length of the packer and how much of the screen it blocks depends on the length of the screen and on how much of the screened section is contaminated. In general, the packer should be long enough to permit it to block all but the lowermost section of the screen contemplated to be left open during a venting sequence. The packer would typically be used to first block off an upper portion of the screen corresponding to soil which has been sufficiently treated. It would then be sequentially lowered to cover screened sections which are no longer contaminated, allowing more air to flow through the lower open sections of the screen.

Figure 3:
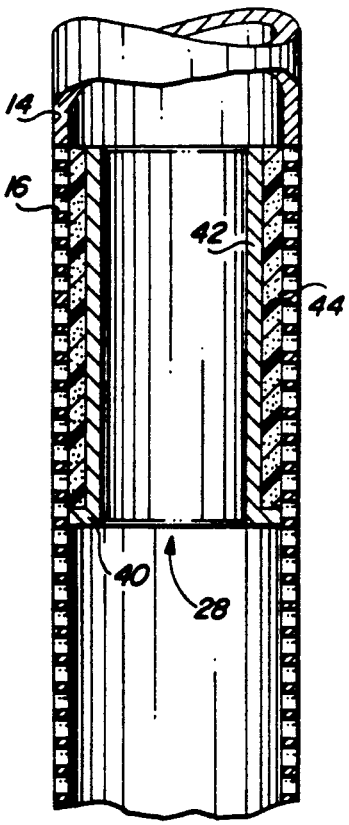
FIG. 3 is an enlarged partial longitudinal sectional view similar to that of FIG. 2, but showing a different means for blocking the flow of air.

Another method of forming a barrier for closing off the upper portion of the casing screen is illustrated in FIG. 3, which shows a packer 40 including a tubular portion 42 spaced from the screen 16. By introducing a mature gel solution into the annulus between the tubular portion 42 and the casing screen in a quantity which covers the upper portion of the screen desired to be closed off, the solution will be supported on the packer and will mature into a rigid gel 44 to complete the sealing operation. Although any desired gel capable of sealing the screen may be used, the gel should be capable of being poured or pumped into position and subsequently crosslinking in place to form a mature, nonflowable, impermeable gel. Examples of such gels are those comprised of a carboxylate-containing polymer crosslinked with a crosslinking agent comprising a chromic carboxylate complex. Complexes of this type and their method of preparation are well known in the gelling art and do not require further detailed discussion.

Figure 5:
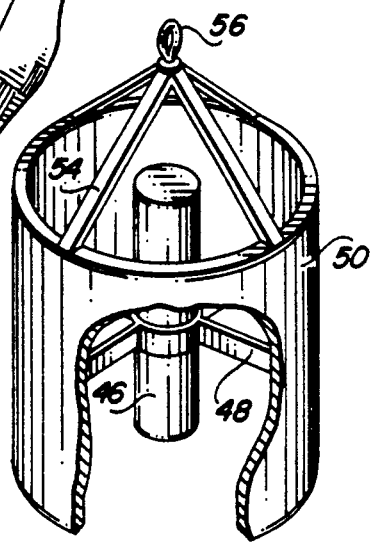
FIG. 5 is an enlarged pictorial view of the holder of the air flow measuring device.
Figure 4:
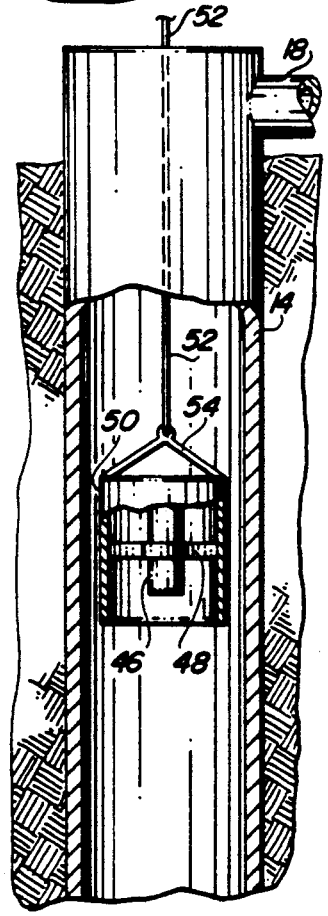
FIG. 4 is a partial longitudinal sectional view of the upper portion of a soil venting well casing, showing a means for measuring air flow in the casing.

In addition to blocking portions of the air passageways in the casing, as part of a soil remedial operation the flow profiles should be evaluated periodically to help in assessing performance. This includes taking air speed measurements in the well during the operation. To assure the measurements are accurate and not affected by side stream flow, the arrangement shown in FIGS. 4 and 5 is employed wherein an anemometer probe 46 is attached by brackets or supports 48 to a shroud 50 suspended from the surface by line 52. The shroud is shown in the form of an open-ended cylinder or tube having straps 54 converging together at the upstream end. The line 52 is connected to the straps by any suitable means, such as through the hook 56. Because air drawn up through the casing is forced by the shroud to flow in a linear path past the anemometer, the speed of the air stream can be accurately determined without being erroneously affected by side stream flow. The open bottom end of the cylinder and the large spaces between the straps 54 permit unrestricted flow to take place.

It will be understood that the description of the air passageways in the casing is not limited to use of a screen. Any type of air permeable structure which permits flow of air into the well casing, such as openings formed directly in the casing wall, may be employed instead.

It can now be appreciated that the invention provides a simple, reliable and efficient way to obtain maximum soil remediation through use of a single venting well by selectively treating soil at sequentially greater distances from the well and at greater depths. The means for causing the altered air flow resulting in such selective treatment is economical but highly effective. Although a preferred embodiment of the invention has been described, it will be appreciated that it is possible to make changes to certain specific details of the preferred embodiment without departing from the spirit and scope of the invention, as defined in the appended claims.

What is claimed is:

1. A method of controlling the flow of air in a soil venting well having a casing containing air passageways, comprising:
   causing air to f low f rom the surf ace, through the soil and into the casing through a first group of passageways in the casing, whereby the air flows through soil which is relatively near the well;
   preventing air from flowing through the first group of passageways; and
   causing air to flow into the casing through a second group of passageways in the casing located beneath the first group, whereby air is drawn through soil located relatively far from the well.

2. A method of controlling the flow of air in a soil venting well as defined in claim 1, wherein air is prevented from flowing through the first group of passageways in the casing by sealing the passageways in the first group against the passage of air.

3. A method of controlling the flow of air in a soil venting well as defined in claim 2, wherein the air passageways are sealed by introducing an inflatable packer into the casing, locating the inflatable packer opposite the first group of passageways and activating the packer.

4. A method of controlling the flow of air in a soil venting well as defined in claim 2, wherein the air passageways are sealed by introducing an annular support into the casing, locating the annular support beneath the first group of passageways, introducing onto the annular support opposite the first group of passageways a gel solution capable of maturing into an impermeable gel, and permitting the gel solution to mature into said impermeable gel.

5. A method of controlling the flow of air in a soil venting well as defined in claim 1, wherein the air passageways comprise openings in a screen incorporated in the casing.

6. A method of controlling the flow of air in a soil venting well employed in a soil remedial operation, comprising:
   drawing air from the surface into a first section of the well through soil located relatively close to the well; and
   drawing air from the surface into a lower section of the well through soil located relatively far from the well by preventing air from being drawn into the well through the first section thereof.

7. A method of controlling the flow of air in a soil venting well as defined in claim 6, including the step of taking air flow measurements in the well prior to drawing air into the lower section of the well to determine when to draw air through said lower section.

8. A method of controlling the flow of air in a soil venting well as defined in claim 7, wherein the air flow measurements are taken by means of a flow anemometer, the anemometer being shrouded so as to channel the air flow past the anemometer in a substantially linear path parallel to the well casing.

9. A method of operating a soil venting well in a soil remedial operation, comprising:
  treating a first section of soil by drawing air therethrough into a first group of passageways in a well casing and up the well casing to the surface; and
  treating a second section of soil located radially outwardly from and deeper than the first section of soil by drawing air through the second soil section into a second group of passageways in the well casing located beneath the first group of passageways while preventing air from entering the first group of passageways.

10. A method of operating a soil venting well in a soil remedial operation as defined in claim 9, wherein one or more additional sections of soil are treated, each section of soil being located progressively more radially outwardly from and deeper than the previously treated section of soil, by preventing air from entering previously employed air passageways while drawing air into a next lower group of air passageways.

* * * * *

UNITED STATES PATENT AND TRADEMARK OFFICE
CERTIFICATE OF CORRECTION

PATENT NO. : 5,293,941

DATED : March 15, 1994

INVENTOR(S) : LaVaun S. Merrill, Jr.

It is certified that error appears in the above-identified patent and that said Letters Patent is hereby corrected as shown below:

| | |
|---|---|
| Col. 1, line 22: | Delete "surf ace" and insert --surface--. |
| Col. 1, line 32: | Delete "surf ace" and insert --surface--. |
| Col. 2, line 2: | Delete "f low" and insert --flow--. |
| Col. 2, line 60: | Delete "f or" and insert --for--. |
| Col. 4, line 19: | Delete "f low" and insert --flow--. |
| Col. 4, line 19: | Delete "f rom" and insert --from--. |
| Col. 4, line 19: | Delete "surf ace" and insert --surface--. |

Signed and Sealed this

Twenty-sixth Day of July, 1994

*Attest:*

BRUCE LEHMAN

*Attesting Officer*   *Commissioner of Patents and Trademarks*